United States Patent
Murphy et al.

(10) Patent No.: US 10,164,920 B2
(45) Date of Patent: Dec. 25, 2018

(54) MESSAGE ATTACHMENT MANAGEMENT

(71) Applicant: Apple Inc., Cupertino, CA (US)

(72) Inventors: Evan S. Murphy, Santa Clara, CA (US); Christopher J. Lindsay, San Jose, CA (US); Cristobal Baray, Sunnyvale, CA (US); Ian W. Anderson, San Jose, CA (US); Neil V. Jhaveri, San Jose, CA (US); Terence D. Blanchard, San Jose, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 14/292,644

(22) Filed: May 30, 2014

(65) Prior Publication Data

US 2015/0350133 A1   Dec. 3, 2015

(51) Int. Cl.
*G06F 15/16* (2006.01)
*H04L 12/58* (2006.01)
*H04L 29/06* (2006.01)
*H04L 29/08* (2006.01)
*G06Q 10/10* (2012.01)

(52) U.S. Cl.
CPC .......... *H04L 51/08* (2013.01); *G06Q 10/107* (2013.01); *H04L 67/02* (2013.01); *H04L 67/42* (2013.01); *H04L 69/04* (2013.01)

(58) Field of Classification Search
CPC ..... H04L 51/08; H04L 67/42; H04L 67/2857; H04L 67/2823; H04L 12/584; H04L 51/00; H04L 51/34; G06Q 10/107; G06Q 10/10; G06F 21/32
USPC .............. 709/206; 358/1.15; 380/255; 726/4
See application file for complete search history.

(56) References Cited

U.S. PATENT DOCUMENTS

| 5,781,901 A * | 7/1998 | Kuzma | G06Q 10/107 |
| 7,054,905 B1 * | 5/2006 | Hanna | G06Q 10/107 |
| | | | 709/206 |

(Continued)

FOREIGN PATENT DOCUMENTS

| WO | 2001075651 A2 | 10/2001 | |
| WO | WO 0175651 A2 * | 10/2001 | ........... G06Q 10/107 |

(Continued)

OTHER PUBLICATIONS

PCT Application No. PCT/US2015/027237—International Search Report and Written Opinion dated Jul. 21, 2015.

(Continued)

*Primary Examiner* — Viet D Vu
(74) *Attorney, Agent, or Firm* — Dickinson Wright RLLP

(57) ABSTRACT

A method and system for exchanging email attachments is disclosed. An attachment can be sent to one or more recipients using a file hosting service. In this way, instead of including the attachment with the email, the attachment is sent and stored on a file server. The attachment can later be retrieved by the email's recipients using a link that is included in the email. The link can be embedded in the email's header or body. In one case, the attachment is automatically retrieved from the file server using the link. In another case, a recipient can manually retrieve the attachment from the file server using the link. A link can be associated with an expiration date such that when a link expires, the link can no longer be used to retrieve the attachment.

20 Claims, 13 Drawing Sheets

(56) References Cited

U.S. PATENT DOCUMENTS

| | | | | |
|---|---|---|---|---|
| 7,746,989 B2* | 6/2010 | Mazor | H04L 51/00 | 379/88.01 |
| 8,185,591 B1* | 5/2012 | Lewis | H04L 51/08 | 358/1.15 |
| 8,429,233 B2* | 4/2013 | Sell | H04L 51/22 | 709/201 |
| 8,510,557 B2* | 8/2013 | Errico | G06F 21/32 | 380/255 |
| 8,694,588 B2* | 4/2014 | Tsai | G06Q 10/10 | 709/203 |
| 9,166,937 B2* | 10/2015 | Kallman | G06Q 10/107 | |
| 2003/0041112 A1* | 2/2003 | Tada | G06Q 10/107 | 709/206 |
| 2004/0034688 A1* | 2/2004 | Dunn | G06Q 10/107 | 709/206 |
| 2004/0059789 A1* | 3/2004 | Shum | H04L 51/34 | 709/206 |
| 2004/0186851 A1* | 9/2004 | Jhingan | H04L 51/00 | |
| 2004/0199588 A1* | 10/2004 | Keohane | G06Q 10/107 | 709/206 |
| 2006/0195526 A1* | 8/2006 | Lederer | G06Q 10/107 | 709/206 |
| 2007/0143419 A1* | 6/2007 | Plas | G06Q 10/107 | 709/206 |
| 2011/0032273 A1 | 2/2011 | Sylthe et al. | | |
| 2012/0151379 A1* | 6/2012 | Schultz | H04L 51/08 | 715/752 |
| 2012/0198003 A1* | 8/2012 | Schechter | G06Q 10/107 | 709/206 |
| 2012/0278405 A1* | 11/2012 | Costenaro | H04L 67/2857 | 709/206 |
| 2012/0278407 A1* | 11/2012 | Meisels | H04L 51/08 | 709/206 |
| 2013/0104053 A1* | 4/2013 | Thornton | G06F 3/048 | 715/752 |
| 2013/0332849 A1* | 12/2013 | Santos | G06Q 10/107 | 715/752 |
| 2013/0333022 A1* | 12/2013 | Torkkel | G06F 21/31 | 726/17 |
| 2014/0297759 A1* | 10/2014 | Mody | H04L 51/10 | 709/206 |
| 2015/0264111 A1* | 9/2015 | Aleksandrov | H04L 67/2823 | 726/4 |
| 2015/0271117 A1* | 9/2015 | Massand | H04L 51/08 | 715/752 |

FOREIGN PATENT DOCUMENTS

| | | | | |
|---|---|---|---|---|
| WO | WO2007133504 | | 11/2007 | |
| WO | WO 2007133504 A2 * | 11/2007 | | G06Q 10/107 |
| WO | WO 2007133504 A3 * | 9/2008 | | G06Q 10/107 |

OTHER PUBLICATIONS

European Patent Application No. 15799955.8—European Search Report dated Mar. 7, 2017.

* cited by examiner

MESSAGE ATTACHMENT MANAGEMENT

FIELD

The present disclosure relates generally to the exchange of electronic messages. More specifically, the present embodiments relate to the management and exchange of email attachments.

BACKGROUND

Advances in electronic communications have allowed users to exchange electronic messages (e.g., electronic mail (email) messages, text messages, instant messages, etc.) beyond text-based communications. In addition to text, a sender of an electronic message can include various types of attachments (e.g., documents, images, videos, etc.) with the electronic message.

The exchange of attachments, particularly attachments having a large file size, can sometimes overburden the resources of a messaging system that is used to facilitate the exchange of electronic messages. This is particularly true when the messaging system was originally designed to primarily service text-based electronic messages and may not be easily scaled to accommodate the exchange of large files. One solution is to limit the size of an attachment, however the limit can vary for a given messaging provider (e.g., an email service provider), making it problematic for users that use different messaging providers to exchange electronic messages.

SUMMARY

This paper describes various embodiments that relate to the exchange of electronic message attachments.

In one embodiment, a method for sending an email attachment is disclosed. The method can be carried out at a client device. The method can include the following: selecting the email attachment; determining to send the email attachment to a first server; sending the email attachment to the first server; and receiving a link from the server. The link identifies a location of the email attachment that is stored at the first server. The method further includes embedding the link in an email and sending the email to a second server. In one aspect of the embodiment, the email attachment is an image file and a thumbnail of the image is included in the email when the email is sent to the second server.

In another embodiment, a client device is disclosed. The client device includes a network interface, a display screen, a processor, and a storage device. The storage device is configured to store instructions, that when executed by the processor, cause the client device to perform the steps of: receiving an email having attachment information from a first server, the attachment information identifying a file stored at a second server and receiving the file from the second server. The second server is different from the first server. The steps further include storing the file at the client device and associating the stored file with the received email.

In yet another embodiment, a method for storing an email attachment is disclosed. The method can be carried out at a server. The method can include the following: receiving a file from a client device; storing the file at the server; and associating the file with a first link. The first link enables one or more client devices to retrieve the file stored at the server. The method further includes sending the first link to the client device and sending the file to the one or more client devices.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

DETAILED DESCRIPTION

Figure 1:
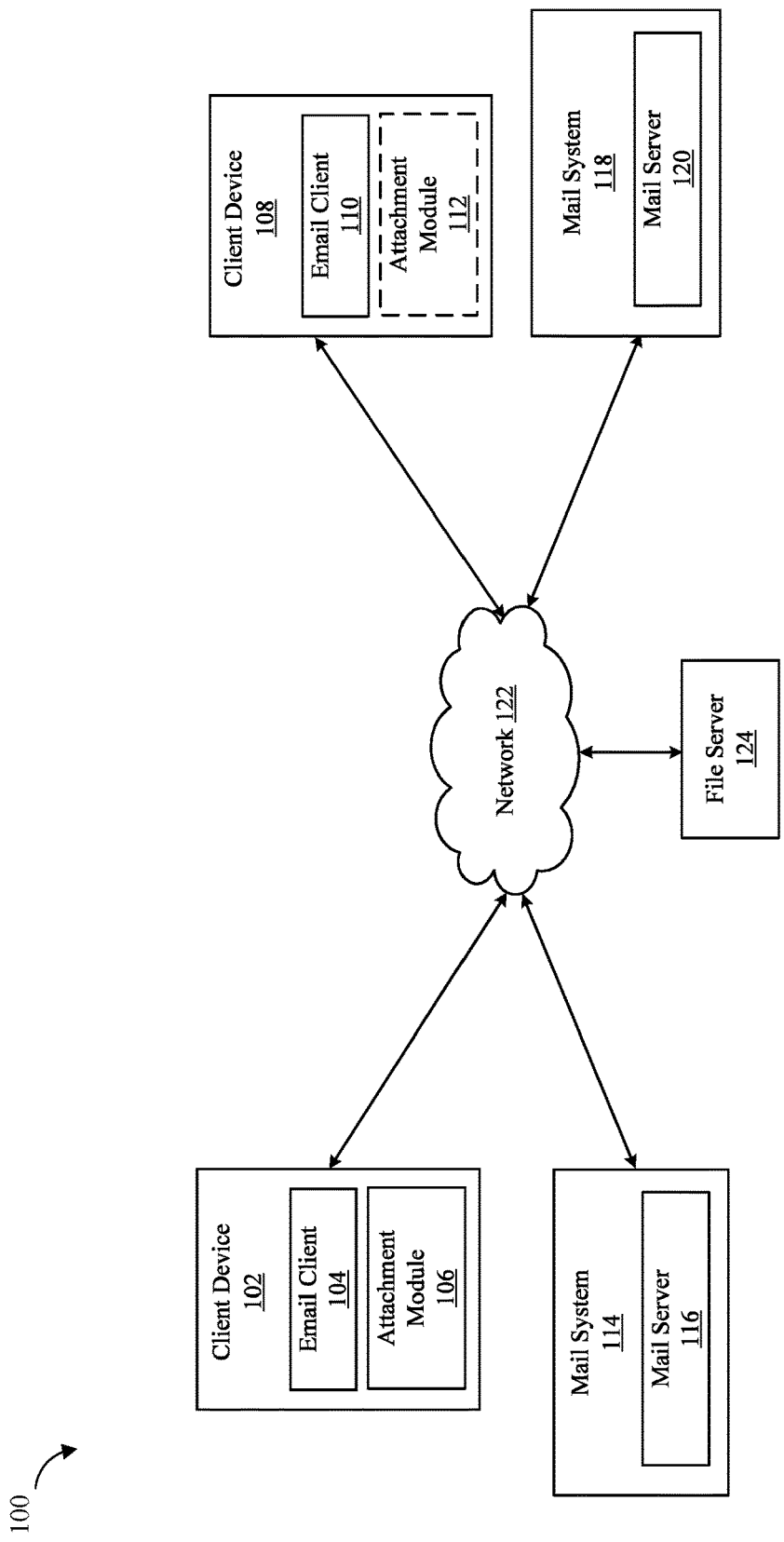
FIG. 1 shows a block diagram of a system in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

An email attachment can be sent using a file hosting service instead of including the email attachment with an outgoing email as known in the art. In this way, issues caused by email attachment file size limitations can be circumvented. An email client sends an email attachment to a file server. In some cases where the email attachment is already stored on the file server, the email client and/or the file server can determine that the email client does not need to send the email attachment to the file server. The file server can associate the email attachment with a link that can be used to retrieve the email attachment from the file server. The file server can then send the link to the email client where the link can be embedded in an outgoing email that is sent to a recipient. The recipient's email client can then retrieve the email attachment from the file server using the link and associate, or "re-compile," the retrieved email attachment with the received email.

In one specific embodiment, a recipient's email client can be configured to identify one or more links embedded in an email, automatically retrieve a corresponding email attachment from the file server using an identified link, and associate the retrieved email attachment(s) with the received email. The aforementioned steps can occur without user interaction. In this way, from the recipient's point of view, it appears as if an email attachment accompanied an email when the email was first received. In another embodiment, the recipient must manually retrieve an email attachment, either by clicking on the links presented to recipient or interacting with thumbnails. The links and thumbnails can be embedded in a body of the received email or be displayed in an interface included in the recipient's email client.

In the case where an email attachment includes one or more image files, the outgoing email can include thumbnails of the images. A recipient's email client can display the thumbnails to the recipient, allowing the recipient to interact with the thumbnails. If an action is performed on a thumbnail, the recipient's email client can retrieve the corresponding full resolution image from the file server. In this way, the user can preview an email attachment using a thumbnail before committing computing resources to retrieve the full resolution counterpart.

A link can be associated with an expiration date. In this regard, an expired link can no longer be used to retrieve the email attachment from the file server. Furthermore, each link can have a unique expiration date based on when an outgoing email was sent. For example, a new link can be associated with an email attachment stored at the file server when a user forwards or re-sends the email attachment. In this way, an email attachment stored at the file server can be associated with several links, each of which can have a different expiration date.

These and other embodiments are discussed below with reference to FIGS. 1-10; however, those skilled in the art will readily appreciate that the detailed description given herein with respect to these figures is for explanatory purposes only and should not be construed as limiting.

FIG. 1 illustrates a block diagram of a system 100 in accordance with some embodiments. More specifically, FIG. 1 illustrates a high-level overview of the system 100, which, as shown, includes a client device 102, a client device 108, a mail system 114, a mail system 118, a network 122 and a file server 124. By way of non-limiting example, the client devices 102/108 can be embodied as a computing device, such as a smart phone device, a tablet computing device, a laptop computing device, and/or other computing device that can be configured to communicate over a network. The client devices 102/108 can be configured to communicate with the mail systems 114/118 over the network 122. The network 122 can include one or more of the Internet, an intranet, a PAN (Personal Area Network), a LAN (Local Area Network), a WAN (Wide Area Network), a MAN (Metropolitan Area Network), a wireless communication network, and other network or combination of networks.

As depicted in FIG. 1, the client device 102 can include an email client 104 and an attachment module 106. The email client 104 is an application utilized by a user of the client device 102 to receive, compose, send, and organize emails. The email client 104 can be configured to run on a particular platform, such as an email client developed for a desktop operating system (e.g., Mac OS X, or other desktop operating system) or an email client developed for a mobile operating system (e.g., iOS, or other mobile operating system). The email client 104 can communicate with the mail system 114 to send and/or receive emails in a known manner, as will be appreciated to those of skill in the art. For example, the email client 104 can be configured to receive and send emails in accordance with a Post Office Protocol (POP), an Internet Message Access Protocol (IMAP) and/or a Simple Mail Transfer Protocol (SMTP) protocol.

The attachment module 106 can be configured to perform and facilitate the email attachment operations in the embodiments described herein. In this way, the attachment module 106 can work in conjunction with the email client 104 and the file server 124 as described in more detail below. Although the attachment module 106 is depicted separated from the email client 104 in FIG. 1, it should be appreciated that in some embodiments the attachment module 106 can be included in the email client 104. For example, the attachment module 106 can be a feature incorporated in the email client 104. In another example, the attachment module 106 can be a plug-in module for the email client 104 that can be installed independently with respect to the email client 104. In some embodiments, the attachment module 106 can be a feature incorporated in an application different from the email client 104, which can work in conjunction with the email client 104 to send files. For example, the attachment module 106 can be incorporated into a photo management application such as for example iPhoto™ by Apple Inc. In this way, a user can select image files from the iPhoto application and invoke email functionality via the attachment module 106 without using an interface of the email client 104. Similarly, the client device 108 can include an email client 110 and an attachment module 112 that can be similar to the email client 104 and the attachment module 106, respectively. In other embodiments, the client device 108 can be different from client device 102 in that the client device 108 may not include the attachment module 112.

The mail system 114 can be configured to provide email services for one or more client devices. For example, the mail system 114 can be configured to manage and store at least a portion of email messages associated with an email account. The portion of email messages can be stored in the mail server 116. Although the mail server 116 is depicted as a single server in FIG. 1, it should be appreciated that the mail server 116 can include a number of servers that cooperate to provide email services. For example, the mail server 116 can include one server that functions as an incoming mail server and a second server that functions as an outgoing mail server. In another example, the mail server 116 can be a single computing device that functions as both an incoming and outgoing mail server.

In some embodiments, the mail server 116 can be part of or work in conjunction with a file hosting service (for example, iCloud™ by Apple Inc.). In this regard, the mail system 114 can work in conjunction with the file server 124 to perform the embodiments described herein. In some embodiments, a user can have an email account with the mail system 114 and a separate account for the file server 124. The mail system 114 and the file server 124 can work in conjunction to verify and associate both accounts to enable the exchange of attachments as described for in the embodiments herein.

The mail system 118 can be similar to the mail system 114. In this regard, the mail system 118 can include a mail server 120 for providing email services as described above for mail server 116. The mail system 114 and mail system 118 can be owned and operated by different email service providers, respectively. For example, the mail system 114 can be embodied as iCloud™ Mail by Apple Inc., while the mail system 118 can be embodied as Gmail™ by Google Inc. Each mail system 114/118 can have unique operational requirements, characteristics and/or protocols. For example, the mail system 114 can limit an email attachment size to a maximum of 50 MB while the mail system 118 can limit an email attachment size to a maximum of 15 MB. In another example, the mail system 118 can block the exchange of email attachments containing compressed files (e.g., Zip files) while the mail system 114 permits the exchange of email attachments containing compressed files. Differences between the mail system 114 and the mail system 118 can cause problems when exchanging emails between the mail systems 114/118. Continuing the first example above, if an email attachment having a file size of 20 MB (i.e., a size larger than the 15 MB limit of the mail system 118) is sent from the mail system 114 to the mail system 118, the email will be "bounced." This can coincide with the email's sender receiving a report indicating the email was not properly sent.

The file server 124 can be a server that is configured to store, host and manage multiple files (sometimes referred to as a "cloud" server). The file server 124 can include one or more databases, applications, directories, and/or other components that work together to enable the file server 124 to host files that are accessible to the client devices 102/108. In this regard, the client devices 102/108 can be configured to communicate with the file server 124 via the network 122. Furthermore, the file server 124 can be configured to manage and allocate storage for a number of accounts. In this regard, the file server 124 can authenticate users and client devices that request file hosting services (i.e., retrieving and storing files) from the file server 124.

Figure 2:
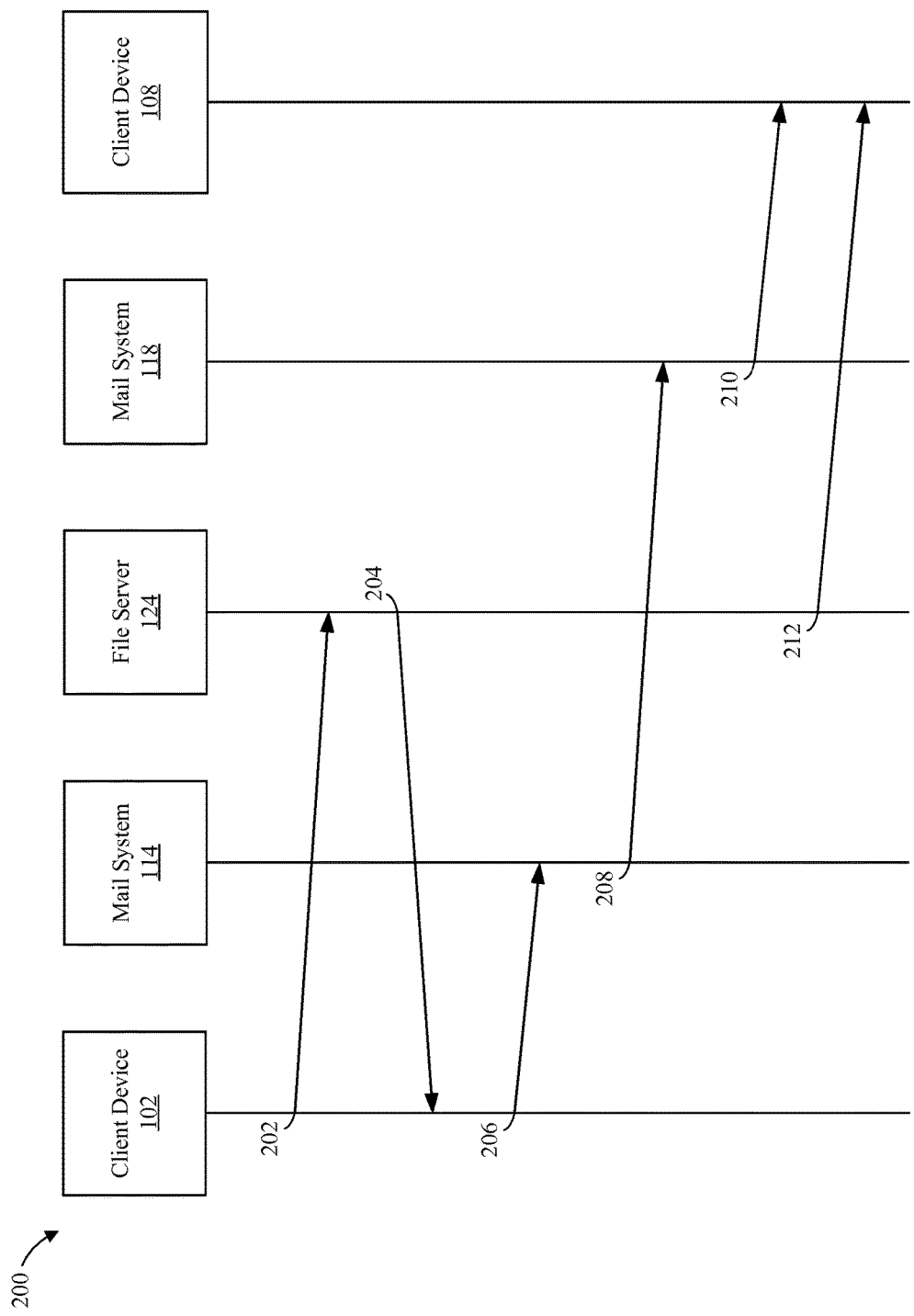
FIG. 2 shows a diagram representing an email exchange in accordance with some embodiments.

FIG. 2 illustrates a diagram 200 representing an email exchange in accordance with some embodiments. The email exchange can be carried out by the client device 102, the client device 108, the mail system 114, the mail system 118, and the file server 124. At 202, an email is generated at the client device 102. The step 202 further includes sending an attachment that is associated with the email to the file server 124. Upon receiving the attachment, the file server 124 stores the attachment and associates the attachment with a link that can be used to reference and retrieve the attachment from the file server 124. For example, the link can be a uniform resource locator (URL). At 204, the link can be sent to the client device 102 where the link is embedded in the email. Next, at 206, the client device 102 sends the email to the mail system 114 for delivery. For example, the client device 102 can send the email to mail server 116 of the mail system 114 that functions as an outgoing mail server. The attachment does not accompany the email when it is sent to the mail system 114 at step 206. In this regard, instead of including the attachment with the email, the link (to attachment) is included in the email. The mail system 114 delivers the email to mail system 118 at 208. For example, the mail system 114 can deliver the email to mail server 120 that functions as an incoming mail server for the mail system 118. At 210, the client device 108 can retrieve the email from the mail system 118 which can include the email client 110 polling the mail server 120 for new messages. At 212, the client device 108 can retrieve the attachment from the file server 124 using the embedded link. In some embodiments, the client device 108 automatically retrieves (i.e., downloads) the attachment from the file server 124 using the embedded link. In other embodiments, a user can manually invoke the retrieval of the attachment. In one scenario, a user of the client device 108 can be notified that the attachment is ready to be retrieved from the file server 124. For example, the link can be embedded in a "banner" or other interface of the email client 110 that can alert the user that an attachment associated with the received email can be retrieved. In another example, the link is embedded in the body of the received email. The user can then click on the link in order to retrieve the attachment from the file server 124.

Figure 3:
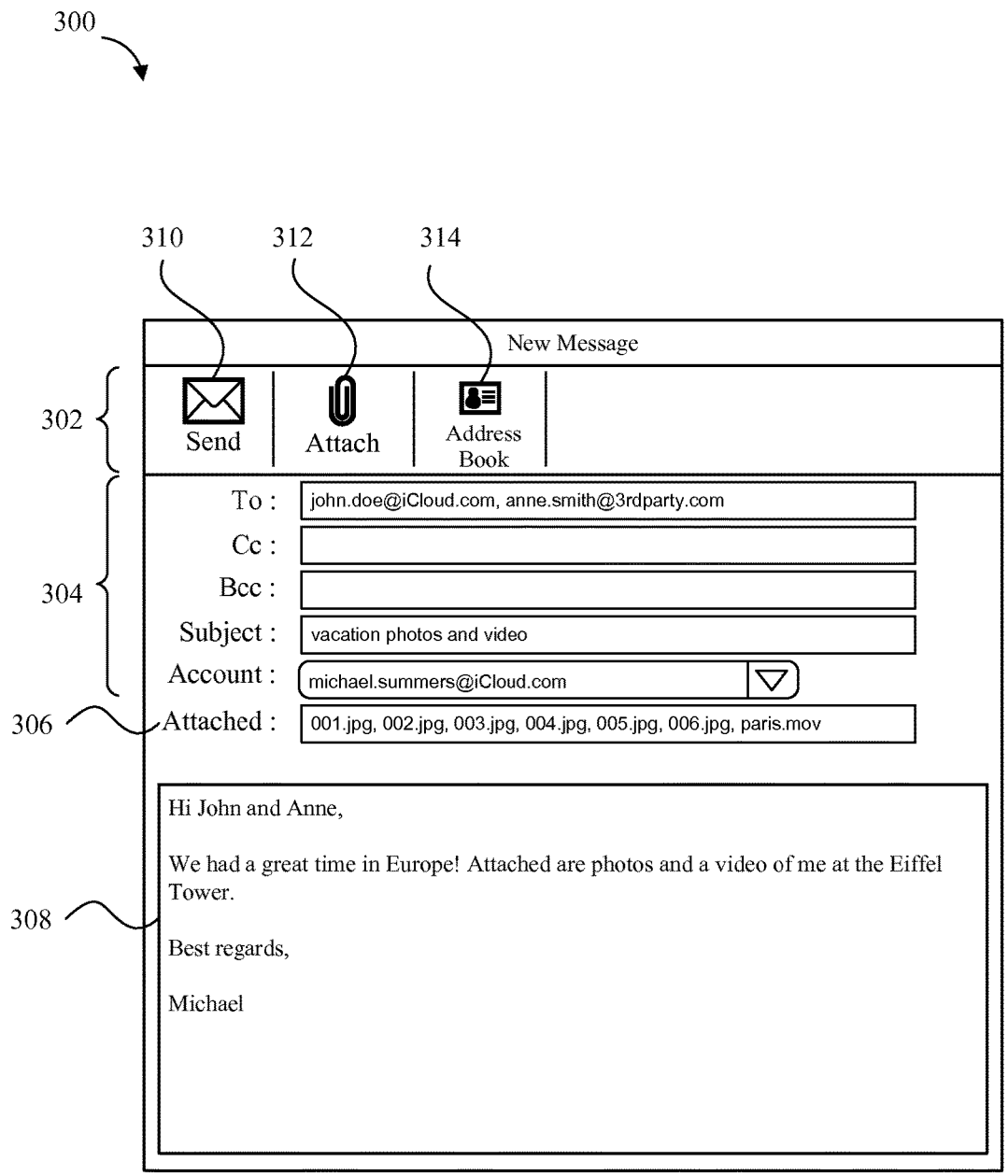
FIG. 3 shows an interface for composing a new email in accordance with some embodiments.

FIG. 3 illustrates an interface 300 for composing a new email in accordance with some embodiments. The interface 300 can be included in the email client 104 and can be utilized by a user to compose a new email. The user can configure each setting displayed in the interface 300 using a user interface device such as a touch screen, keyboard, or mouse. As will be appreciated, the interface 300 can be invoked when a user selects a "New Message" button displayed in a toolbar or inputs an equivalent keyboard shortcut to open a new message window in the email client 104. The interface 300 includes a toolbar 302, email composition fields 304, an attachment field 306 and a message body 308.

The toolbar 302 includes a send button 310, an attach button 312, and an address book button 314. It should be appreciated that other buttons associated with other email operations can be included in the toolbar 302 but are omitted in FIG. 3 for the purposes of conciseness and clarity. The send button 310 can be configured to send the email as is known in the art. The address book button 314 can be used to invoke a list of contacts stored at the client device 102. The list of contacts can be viewed in order to select the recipients of the email (i.e., select email addresses). The user can select one or more files to be attached to the email (referred to herein as an attachment or email attachment) by selecting the attach button 312. In some cases, the user can "drag" a file onto the interface 300 instead of or in addition to selecting the attach button 312. Once an attachment is selected, the attachment field 306 can display the selected files that are attached to the email. For example, the attachment field 306 can display a file name of a selected attachment. The attachment can include an image, a video, an audio file, a document, and/or other type of file. In some embodiments, the attachment includes an image in any image file format (for example, JPEG (jpg), PNG, TIFF, BMP, GIF, or other formats). In other embodiments, the attachment 230 includes a document in a portable document format (PDF).

The email composition fields 304 can include one or more text boxes for entering the email addresses of recipients (i.e., 'To' field, 'CC' field and 'Bcc' field). The email composition fields 304 can also include a 'Subject' field for entering a subject for the email and an 'Account' drop-down menu for selecting an email account to be used in sending the email. A bottom portion of the interface 300 includes a message body 308. The user can compose a message within the message body 308. Typically, the user can include text, attachments, links, and/or other items within the message body 308 to compose the message. The content in the message body 308 can be formatted in accordance with Hyper Text markup Language (HTML) or as plain text. In the example shown in FIG. 3, a user, Michael, has composed an email that will be sent to 'john.doe@icloud.com' and 'anne.smith@3rdparty.com' from an account associated with the email address 'michael.summers@icloud.com.' The email includes seven attachments: six image files (001.jpg, 002.jpg, 003.jpg, 004.jpg, 005.jpg, 006.jpg) and a video file (paris.mov).

Figure 4A:
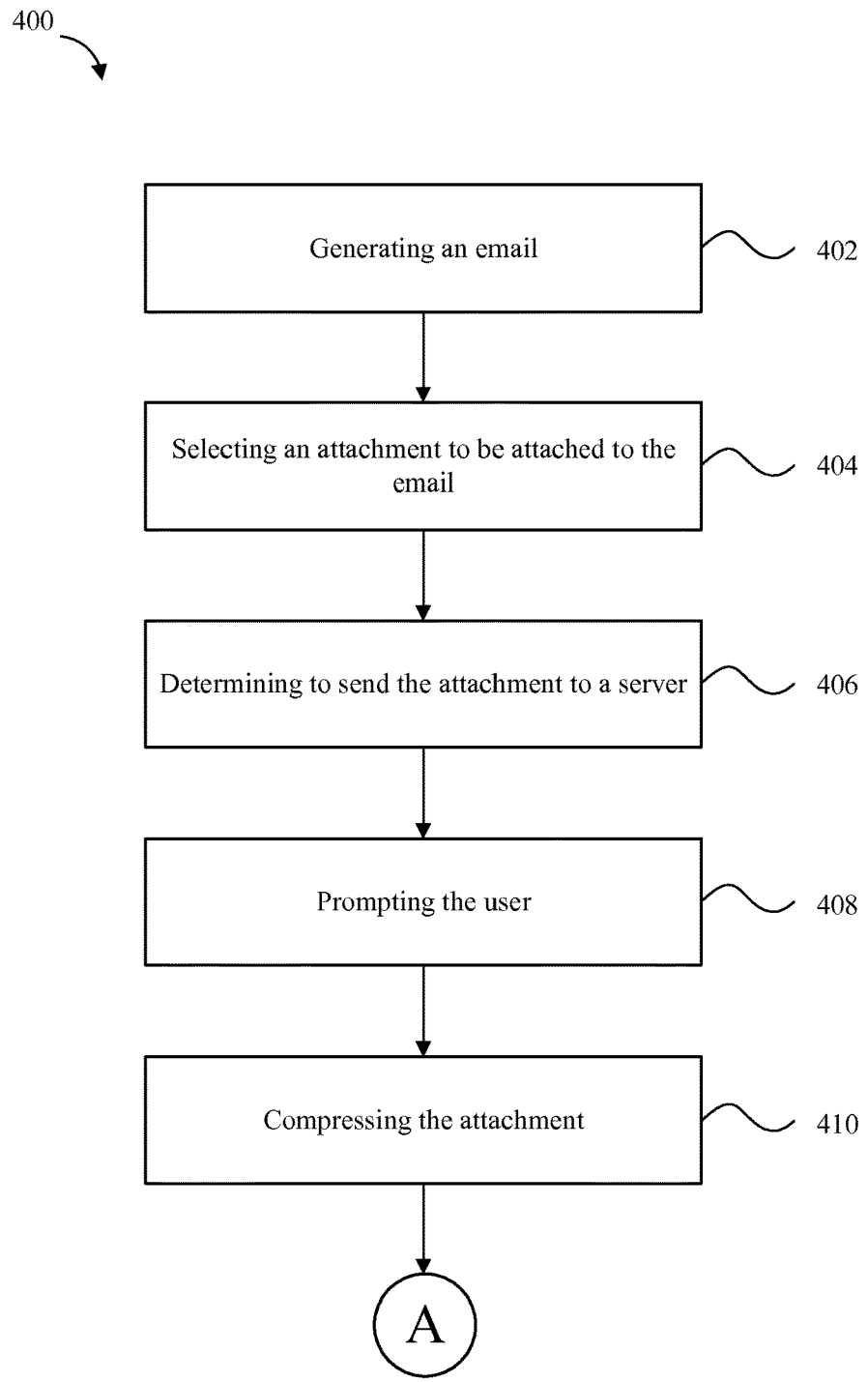
FIGS. 4A and 4B show a flowchart representing a method for sending an attachment in accordance with some embodiments.
Figure 4B:
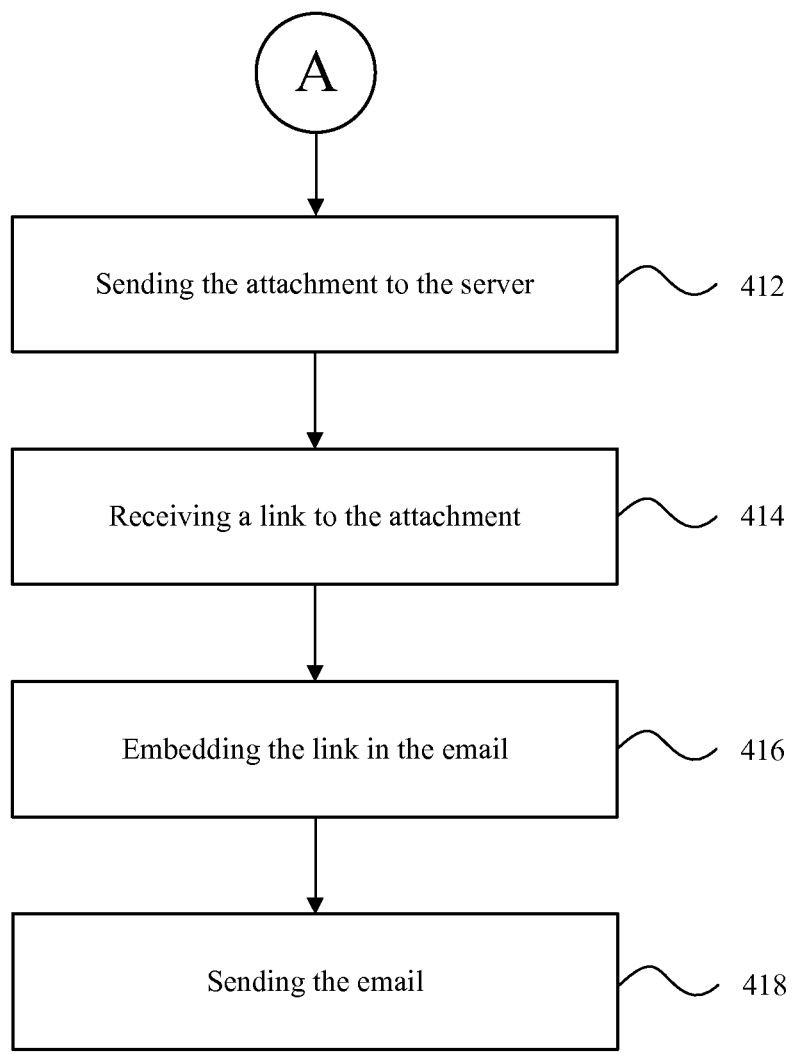

FIGS. 4A and 4B show a flowchart 400 representing a method for sending an attachment in accordance with some embodiments. The method can be carried out by an exemplary client device 102 using the email client 104 and the attachment module 106. In a first step at 402, the email client 104 can generate a new email. For example, the email client 104 can invoke an exemplary embodiment of the interface 300 to generate a new email and a user can interact with interface 300 to compose the new email. Alternatively, an application or other machine readable instruction can be used to compose the new email. For example, an email application or a script can automatically generate the new email based on data accessible to the client device 102. At step 404, an attachment is selected to be attached to the email. As previously described, attachments can be selected by interacting with the attachment button 312 or using a drag-and-drop feature.

At step 406 it is determined the attachment should be sent via a file server (i.e., sent to the file server 124), rather than be included with the email. In some embodiments, the determination can be based on one or more characteristics of the attachment such as, but not limited to, file size (e.g., a maximum/minimum file size), file name (or other identifier), and file type. In other embodiments, the determination can be based on the total size of the email (i.e., including text, HTML content, metadata, header data, etc.) and/or the number of attachments attached to the email. In yet other embodiments, the determination can be based on a characteristic of a mail system associated with a recipient of the email, e.g., mail system 118. A mail system characteristic can include a file size limitation and a file type restriction. In one scenario, the mail system of the recipient can be identified by examining the recipient's email address and identifying a domain associated with the mail system. For example, referring to FIG. 3, the domain portion of the email address 'anne.smith@3rdparty.com' is '3rdparty.com.' Accordingly, the determination can be based on a characteristic of the '3rdparty.com' domain.

In yet other embodiments, the determination can be based on a characteristic of a network, e.g., the network 122, the client device 102 will use to send the email. A network characteristic can include, but is not limited to, a network type (e.g., Ethernet, Wi-Fi, Bluetooth, cellular, etc.), available network resources, bandwidth limitations, signal strength of the network and/or one or more operational rules (as set by a network administrator). For example, a network administrator of the network 122 can prohibit the use of the attachment module 106 and/or block/limit communications with the file server 124. In this way, the determination can be based on whether the file server 124 is available to the client device 102.

In some embodiments, the determination can be based on a characteristic of an account and/or the client device 102. For example, the option to send the attachment via the file server 124 can be available only if the sender's email account (e.g., the account selected in the 'Account' drop down menu in FIG. 3), the client device 102, and/or an account associated with the file server 124 is authorized. In another example, the determination to send the attachment to the file server 124 can be based on the available amount of space allocated to a sender's account on the file server 124.

At step 408, the user of the email client 104 can be prompted with a notice based on the determination made at step 406. For example, the notice can indicate that the attachment is potentially too large and that the attachment will be sent via the file server 124. Step 408 can include receiving input from the user that confirms or rejects (i.e. overrides) the action of sending the attachment to the file server 124.

In some embodiments, the attachment can be compressed at 410 prior to being sent to the file server 124. Step 410 can also include compressing one or more attachments into a single archive file. Compression of the attachment is optional and therefore step 410 can be omitted in certain embodiments. As described in more detail below, the determination to compress an attachment (or several attachments into a single file) can be based on the file type of the attachment.

At step 412, the attachment is sent to the file server 124. In some embodiments, step 412 can include sending the attachment to the file server 124 in response to receiving an input from the user indicating the email can be sent. For example, when the user clicks the send button 310. In other embodiments, sending the attachment to the file server 124 can be in response to receiving a confirmation to the prompt in step 408. While the attachment is being sent to the file server 124, the email client 104 or other interface can report the sending progress to the user. For example, the report can include a percentage of completion and/or the data rate at which the attachment is being sent to the file server 124. In other embodiments, the attachment can be sent to the file server 124 before receiving an input from the user indicating the email can be sent. In this regard, the user can continue to compose the email while the transmission of the attachment to the file server 124 is in progress. For example, the user can add text to the message body 308 and/or add more recipients to the 'To' field in the email composition fields 304.

In some embodiments, step 412 can be performed discontinuously, such that the attachment can be sent to the file server 124 in portions or "chunks." In this regard, if the sending of the attachment is interrupted, it can be resumed again at a later time, obviating the need for the client device 102 to send portions of the attachment that have already been sent to the file server 124. For example, the attachment can be sent to the file server 124 in portions of 32 MB. The file server 124 can use a hash check to verify the portions.

When the attachment is successfully sent to the file server 124, the attachment is stored at the file server 124 and associated with a link. As previously described, the link can be used to retrieve the attachment from the file server 124. The file server 124 can send the link to the client device 102 at step 414. Upon receiving the link, the link can then be embedded in the email at step 416, which can include embedding the link in the email body or the email header. In some embodiments, the metadata associated with files contained in the attachment can be embedded in the email header. For example, metadata and the link can be embedded in an email header in accordance with a Multipurpose Internet Mail Extensions (MIME) standard. The metadata can include information associated with a characteristic of an attachment, such as any characteristic described in step 406. At step 418, the email is sent to a mail server of a mail system, e.g., mail server 116 of mail system 114.

Figure 5A:
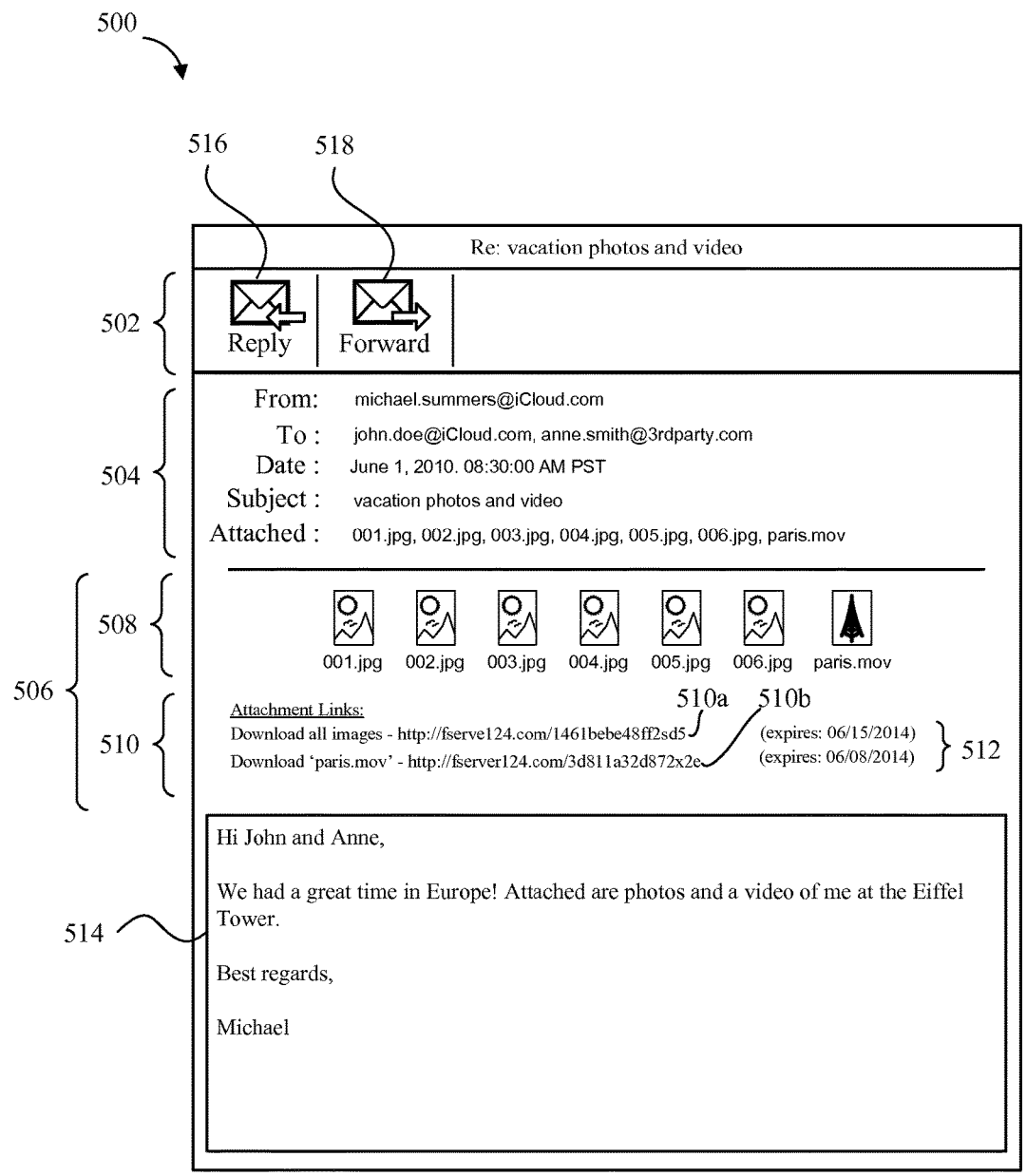
FIG. 5A shows an interface for viewing a received email in accordance with some embodiments.

FIG. 5A illustrates an interface 500 for viewing a received email in accordance with some embodiments. The interface 500 can be included in an email client, e.g., email client 110, and can be utilized by a user to view the contents of a received email. As will be appreciated, the interface 500 can be invoked when a user selects the received email from an inbox interface in the email client 110. The interface 500 includes a toolbar 502, email information fields 504, attachment banner 506 and a message body 514.

The toolbar 502 includes a reply button 516 and a forward button 518. It should be appreciated that other buttons associated with other email operations can be included in the toolbar 502 but are omitted in FIG. 5A for the purpose of conciseness and clarity only. The reply button 516 can be configured to enable the user to reply to the received email and the forward button 518 can be configured to forward the received email to another recipient as known in the art. The email information fields 504 can display information relating to the transmission of the received email. For example, email information fields 504 can include the sender's email address ('From' field), the recipients of the email ('To' field), the date the email was sent ('Date' field), the subject of the email, and a list of the attachments associated with the received email ('Attached' field).

Figure 5B:
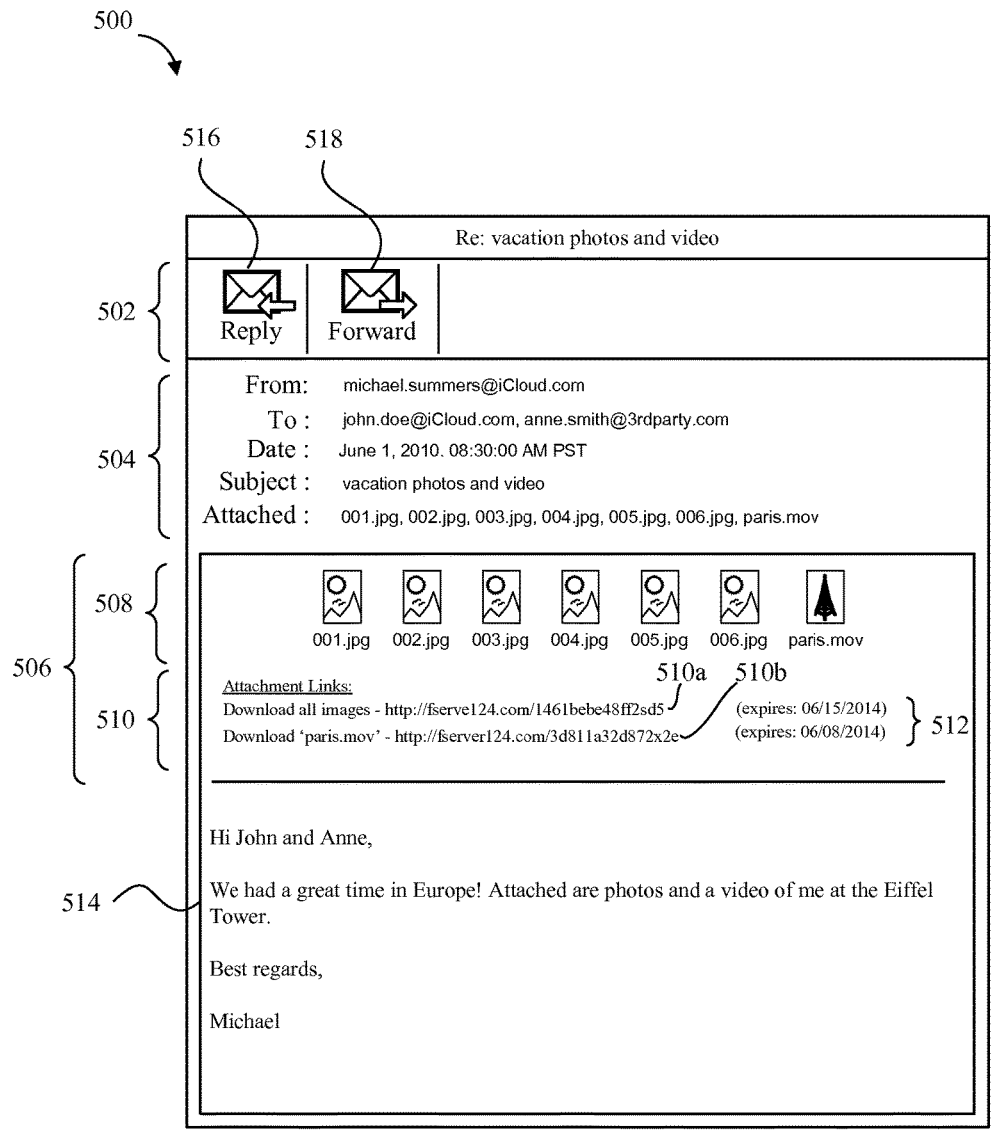
FIG. 5B shows an interface for viewing a received email in accordance with some embodiments.
Figure 5C:
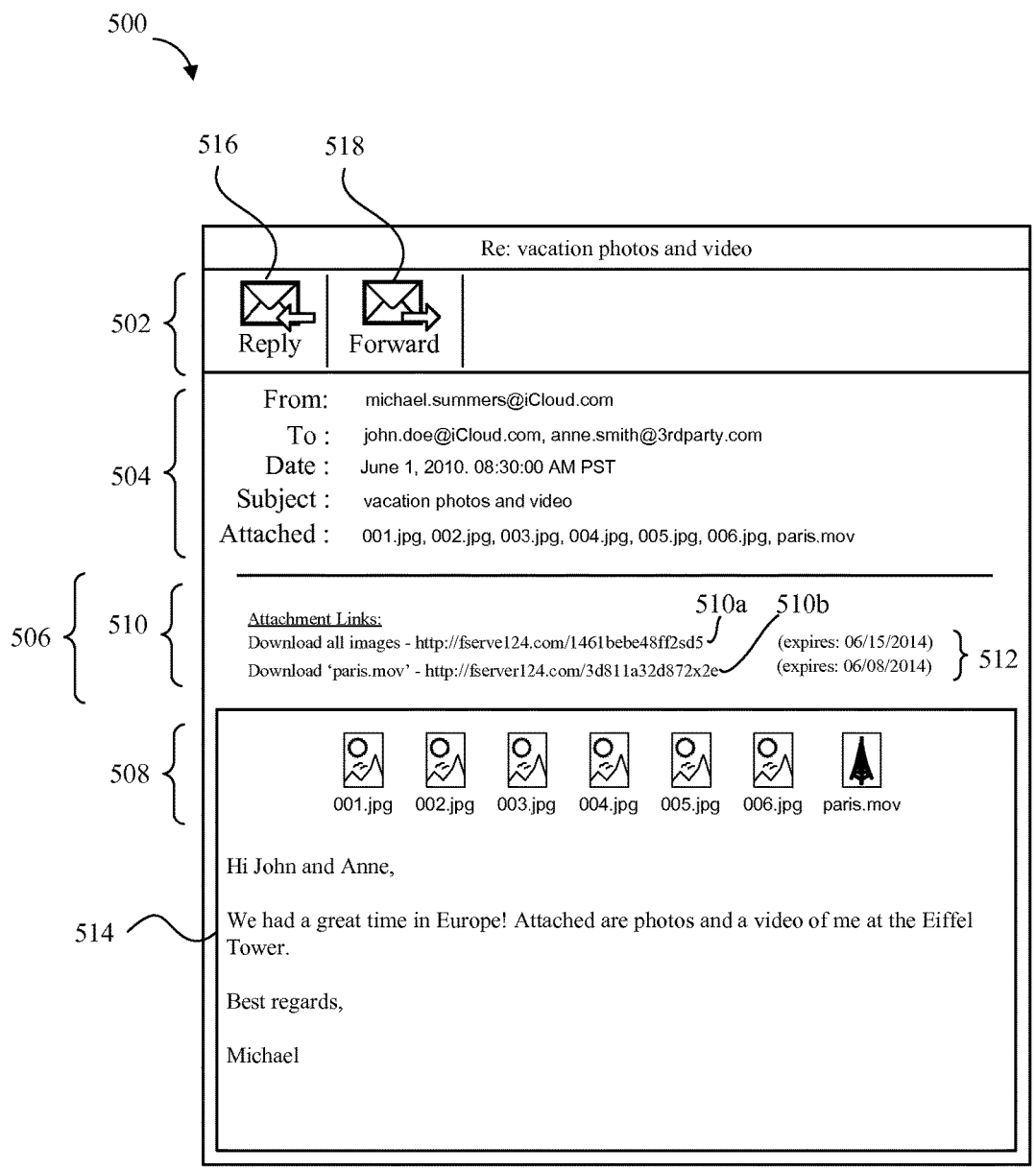
FIG. 5C shows an interface for viewing a received email in accordance with some embodiments.

The attachments associated with the received email can be sent in accordance with the embodiments described in FIG. 2 and/or FIGS. 4A/4B. In this regard, the attachments were not included in the received email but rather were sent to the file server 124. The interface 500 includes an attachment banner 506 that can present the user with additional information associated with the attachments to enable the user to retrieve one or more files from the file server 124. In this embodiment, the attachment banner 506 can be an integrated feature of the email client 110. For example, the attachment module 112 can enable one or more features of the attachment banner 506. In this regard, the attachment banner 506 and/or one or more features of the attachment banner 506 (i.e., thumbnails 508 and/or attachment links 510) can be a proprietary feature that is associated with a particular email client. Furthermore, although the FIGS. 5A-5C depict the attachment banner 506 displaying only thumbnails 508 and/or attachment links 510, it should be appreciated that the attachment banner 506 can be configured to display any information associated with the received email or email attachments. For example, the attachment banner 506 can also display metadata (e.g., a file size) and/or identifiers (e.g., file name) included in the received email.

The attachment banner 506 can include one or more thumbnails 508. Each thumbnail 508 can represent an attachment. In one example, a thumbnail 508 can be a single frame of a video attachment. In another example, a thumbnail 508 can represent a page of a document attachment, such as a PDF file or DOC file. In the case where an attachment is an image file, a thumbnail 508 can be a smaller, compressed version of the original image file. In the example shown in FIG. 5A, the first six thumbnails 508 are low resolution versions of 001.jpg through 006.jpg, respectively. Using a user interface device such as a touch screen, keyboard or mouse, a user of the client device 108 can interact with thumbnails 508. For example, a thumbnail 508 can be saved, deleted, copied or printed. A thumbnail 508 can be configured to act as a proxy for the attachment it represents. In this regard, any action performed on a thumbnail 508 is performed on the corresponding attachment the thumbnail 508 represents. For example, if the user performs a save action on the thumbnail 508 corresponding to '001jpg,' the email client 110 can be configured to retrieve the full resolution version of '001jpg' from the file server 124 and perform the save action on the retrieved '001jpg.' In this way, the user can preview an attachment using a thumbnail 508 before committing computing resources (bandwidth, storage, etc.) to retrieve the attachment from the file server 124. In embodiments where a number of image files are compressed and stored as a single file on the file server 124, if a user invokes an action on a particular thumbnail, e.g., the thumbnail corresponding to '004jpg,' the client device 102 can retrieve the compressed file from the file server 124, uncompress the file, extract '004jpg,' and perform the action on the extracted '004jpg.'

The attachment banner 506 can also include one or more attachment links 510. An attachment link 510 is a link the user can use to retrieve an attachment from the file server 124. In some embodiments, an attachment link 510 can be the link the file server 124 sent the client device 102 in step 204 of FIG. 2. In some embodiments, a single link can be used to download two or more files of the attachment. In the example of FIG. 2, image files 001.jpg through 006.jpg have been compressed and stored on the file server 124 as a single file. Accordingly, attachment link 510a is a link to a compressed file containing all the images included in the attachment (i.e., 001jpg through 006jpg), allowing the user to conveniently download all the image files at once. The attachment link 510b is a link to the video file 'paris.mov.'

In some embodiments, each attachment link 510 can be associated with an expiration date 512. Accordingly, an expiration date 512 can indicate to the user when a corresponding attachment link 510 will expire. In this regard, the file server 124 can disassociate an attachment link 510 with a file such that a user can no longer use the attachment link 510 to retrieve the file. In another case, the expiration date can indicate when the file server 124 will delete the file. In some embodiments, the expiration date 512 can be a different for different files. For example, the expiration date 512 can be based on a file's type, size, and/or any other file characteristic described herein. In some embodiments, the email client 110 can mark which emails have attachments that have not been retrieved from the file server 124. In this way, a user of the email client 110 can retrieve attachments that would otherwise have been overlooked and allowed to expire. In other embodiments, the email client 110 can be configured to warn or notify a user of upcoming expiration dates. Furthermore, the email client 110 can identify expired attachment links 510 and mark them accordingly. For example, attachment banner 506 can be updated to notify the user that an attachment link 510 has expired or remove expired links from the attachment banner 506.

In some embodiments, an attachment link 510 can be embedded with an encryption feature. In this regard, the client device 102 can also send the file server 124 an encryption key in addition to an attachment at step 202 or step 412. The encryption key can be used to encrypt the attachment. The file server 124 can embed a decryption key in the attachment link 510, such that by clicking on the attachment link 510 the attachment is decrypted.

FIG. 5B illustrates an exemplary embodiment of interface 500 in which the attachment banner 506 is embedded in the received email. In this regard, portions of the attachment banner 506 can take the form of HTML content that is embedded in the message body 514. For example, the thumbnails 508 and/or the attachment links 510 can be displayed inline the message body 514 as HTML content. The thumbnails 508 and/or attachment links 510 can be included with the received email as a MIME attachment. In this way, features of the attachment banner 506 can be utilized by an email client 110 that may not support certain embodiments herein (e.g., an exemplary client device 108 without the attachment module 112) but otherwise supports HTML-enabled emails. FIG. 5C illustrates an exemplary embodiment of interface 500 in which the thumbnails 508 are displayed within the message body 514 and the attachment links 510 are displayed as an integrated feature of the email client 110. For example, the thumbnails 508 can be HTML content that is embedded in the message body 514, while the attachment links 510 are displayed within a proprietary interface that is particular to the email client 110.

Figure 6:
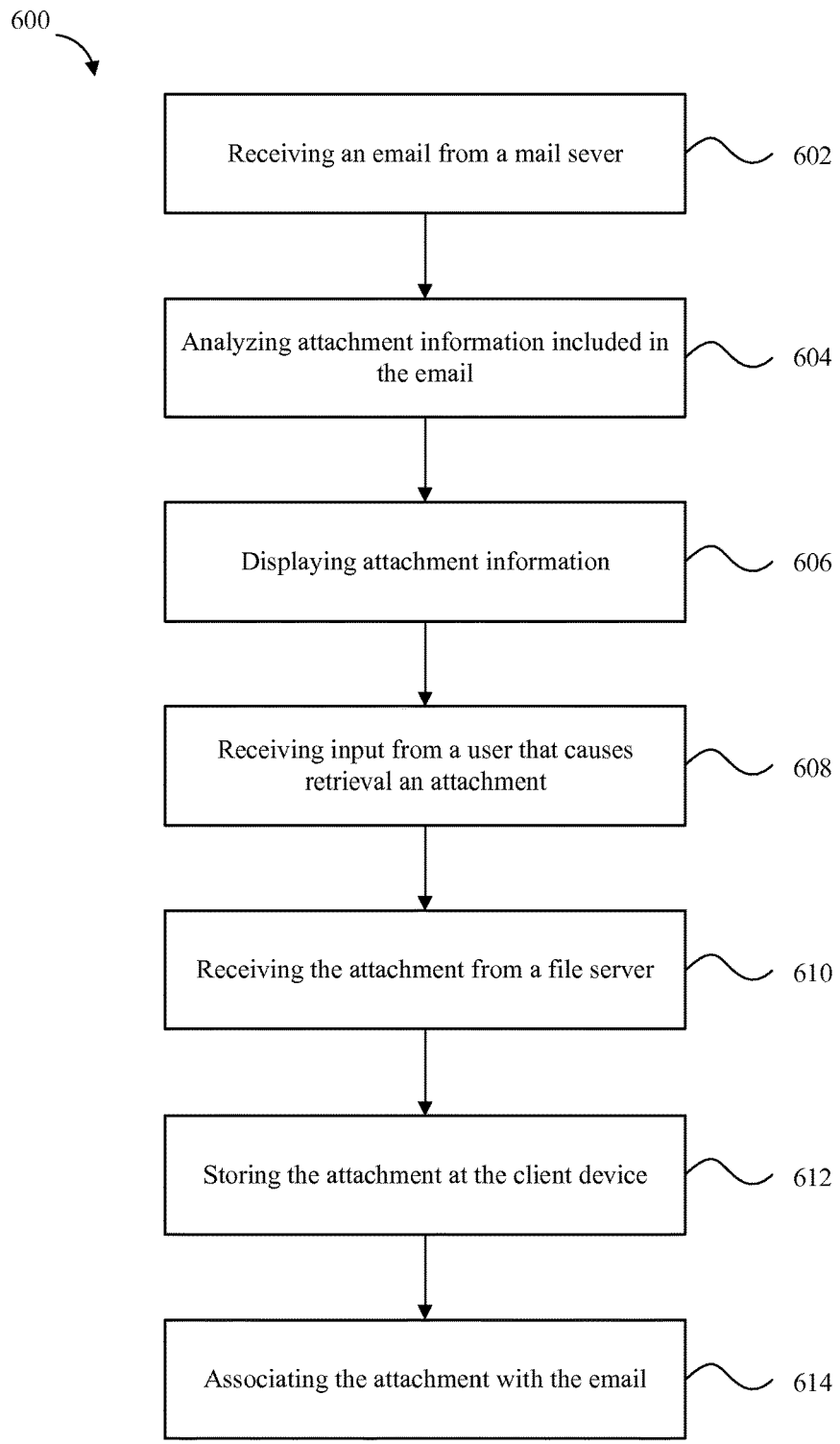
FIG. 6 shows a flowchart representing a method for retrieving an email attachment in accordance with some embodiments.

FIG. 6 shows a flowchart 600 representing a method for retrieving an email attachment in accordance with some embodiments. The method can be carried out by an exemplary client device 108 using the email client 110 and/or attachment module 112. In a first step at 602, the client device 108 receives an email from a mail server, e.g. mail server 116. The received email in step 602 can be an exemplary email as described in any of FIG. 2, FIG. 3, or FIGS. 4A/4B. Included in the received email is attachment information which can include metadata, thumbnails, and/or a link, all of which can be associated with one or more attachments. For example, the attachment information can be embedded in the header of the received email or embedded in the body of the received email. At step 604, the client device 108 analyzes the attachment information and displays a portion of the attachment information at step 606. For example, one or more thumbnails (e.g., the thumbnails 508) or an attachment link (e.g., attachment links 510) can be presented to the user as depicted in FIG. 5A or 5B. Next at step 608, the client device 108 receives input from a user that causes the client device 108 to retrieve (i.e., receive) an attachment from a file server, e.g., the file server 124. For example, step 608 can include the user clicking on a URL or a thumbnail that is associated with an attachment. The client device 108 can then retrieve the attachment from the file server 124 at step 610. Next, the attachment is stored at the client device 108 at step 612 and associated with the received email at step 614. In this regard, when the attachment is subsequently accessed through the email client 110, the email client 110 can use the copy stored at the client device 108, obviating the need to re-retrieve the attachment from the file server 124.

Figure 7:
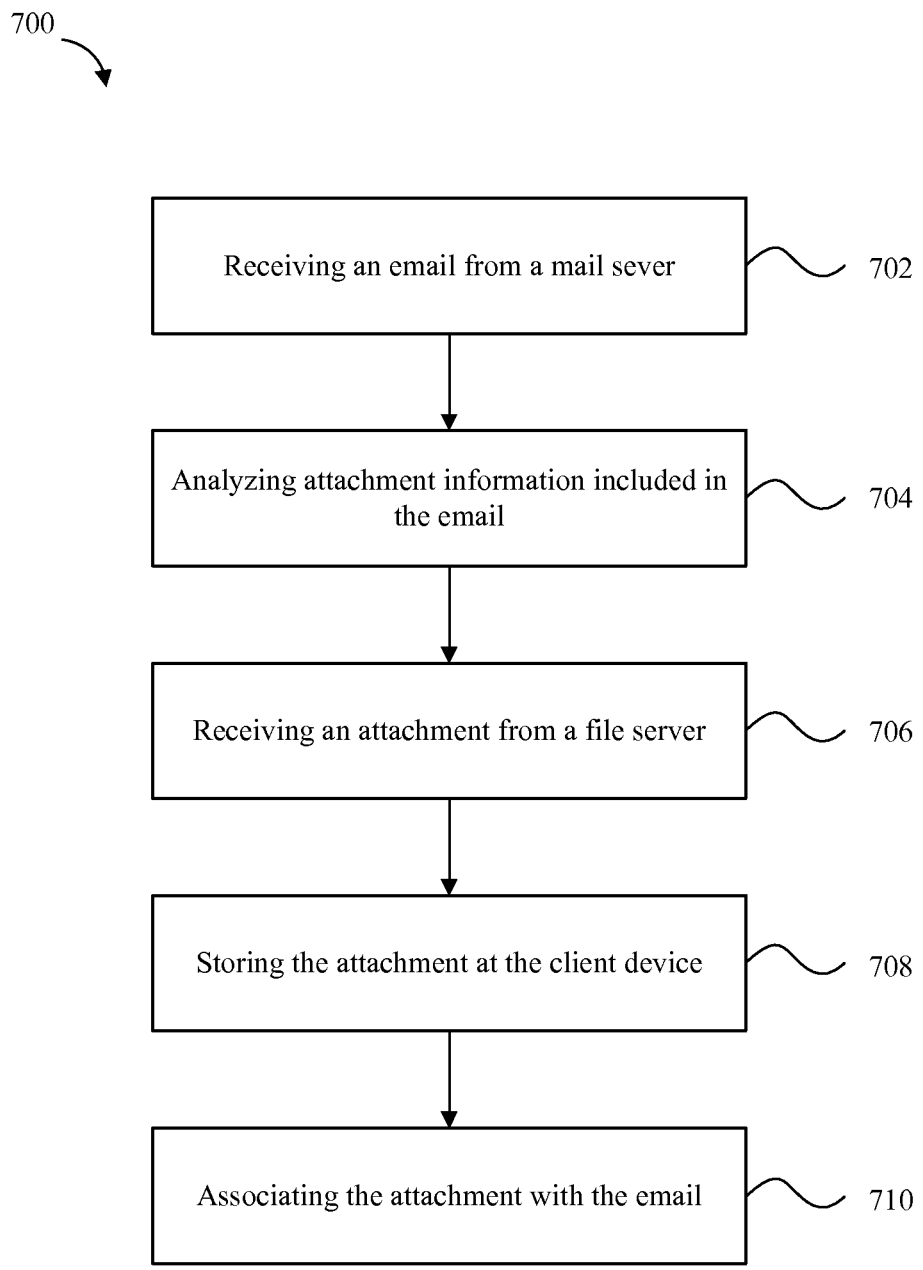
FIG. 7 shows a flowchart representing a method for retrieving an email attachment in accordance with some embodiments.

FIG. 7 shows a flowchart 700 representing a method for retrieving an email attachment in accordance with some embodiments. The method can be carried out by an exemplary client device 108 using the email client 110 and/or attachment module 112. In a first step at 702, the client device 108 receives an email from a mail server, e.g. mail server 116. The received email in step 702 can be an exemplary email as described in any of FIG. 2, FIG. 3, or FIGS. 4A/4B. Embedded in the received email is attachment information, which can include metadata and/or a link that is associated with one or more attachments. For example, the attachment information can be embedded in the header of the received email or embedded as inline content in the email message body, e.g. message body 514. At step 704, the client device 108 analyzes the embedded attachment information and identifies a link that can be used to retrieve an attachment from a server, e.g., the file server 124. The client device 108 can then retrieve (i.e., receive) the attachment from the file server 124 at 706. The retrieval of the attachment can occur automatically. In this way, no user interaction is required such that retrieval of the attachment can occur in the "background" during the operation of the client device 108. Next, the attachment is stored at the client device 108 at step 708 and associated with the received email at step 710. In this way, from the user's point of view, it appears as if the attachment accompanied the email when the email was received at step 702. Furthermore, when the attachment is subsequently accessed through the email client 110, the email client 110 can use the copy stored at the client device 108, obviating the need to re-download the attachment from the file server 124.

Figure 8:
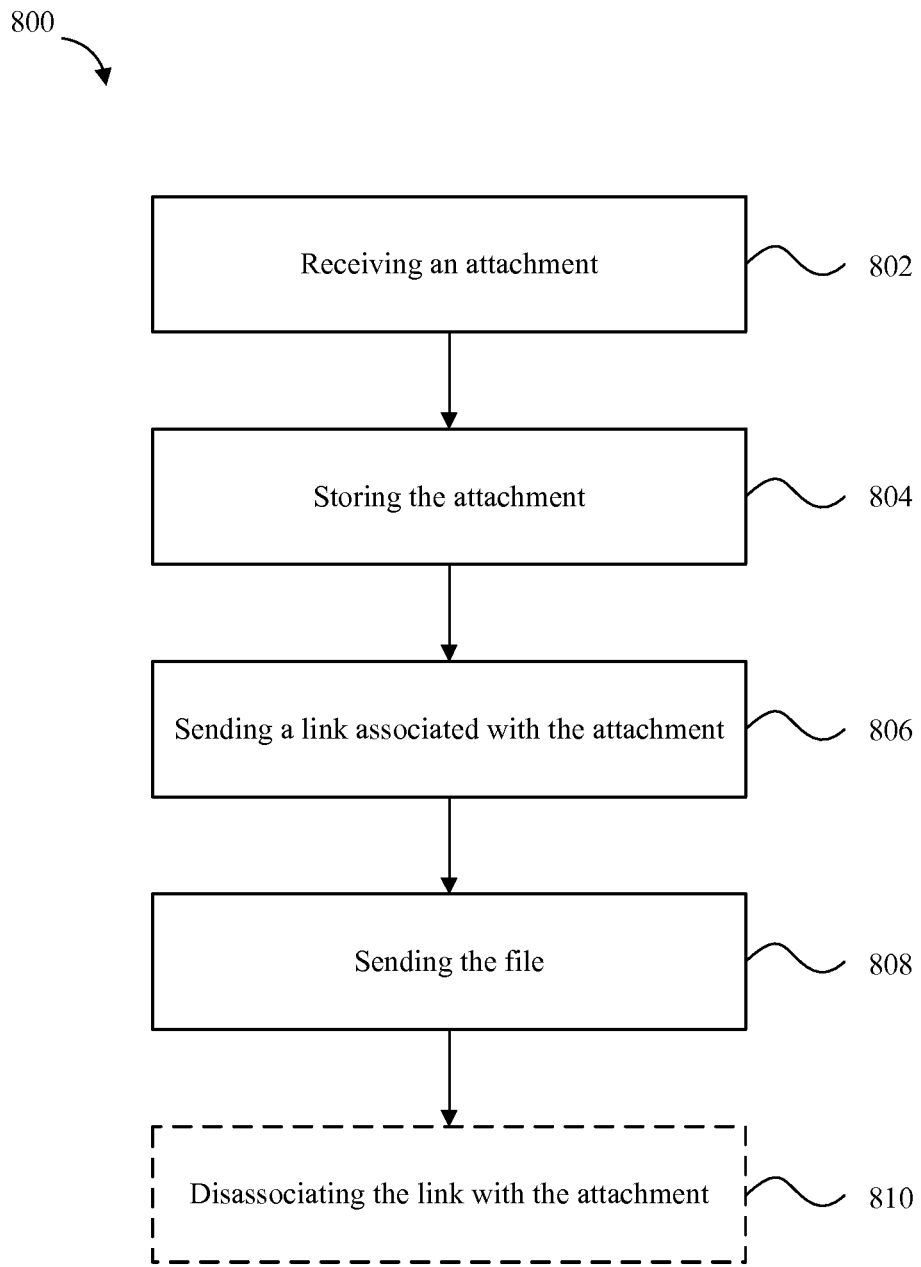
FIG. 8 shows a flowchart representing a method for hosting an email attachment in accordance with some embodiments.

FIG. 8 shows a flowchart 800 representing a method for hosting an email attachment in accordance with some embodiments. The method can be carried out by an exemplary file server 124. In a first step at 802, the file server 124 can receive an attachment from a client device, e.g., client device 102. The attachment can be stored at the file server 124 at step 804. At step 806, the file server 124 can associate the stored file with a link and send the link to the client device 102. The link can be used to retrieve the attachment from the file server 124.

In one embodiment, one or more files in the attachment may already be stored on the file server 124 because the client device 102 previously sent the file in another email. Using the example depicted in FIG. 3, Michael sends John and Anne the files identified in attachment field 306 in a first email, causing 001.jpg through 006.jpg to be sent to and stored at the file server 124. Subsequently, Michael sends Jake the files '001.jpg,' '002.jpg' and a PDF document 'MeetingAgenda.pdf,' in another email. Since '001.jpg' and '002.jpg' are already stored at the file server 124, the client device 102 only needs to send 'MeetingAgenda.pdf' to the file server 124 at step 802. Furthermore, step 806 can include sending links associated with files '001.jpg' and '002.jpg' in addition to a link associated with 'MeetingAgenda.pdf.'

At step 808, the recipient, e.g., the client device 108, can retrieve the attachment from the file server 124. In embodiments in which the link is associated with an expiration date, the file server 124 can disassociate the link with the attachment when the link expires at step 810. In this way, a remote device cannot use an expired link to retrieve the attachment from the file server 124. In some embodiments, the file server 124 can delete the attachment when the link (and/or all links associated with the attachment) expires at step 810.

Figure 9:
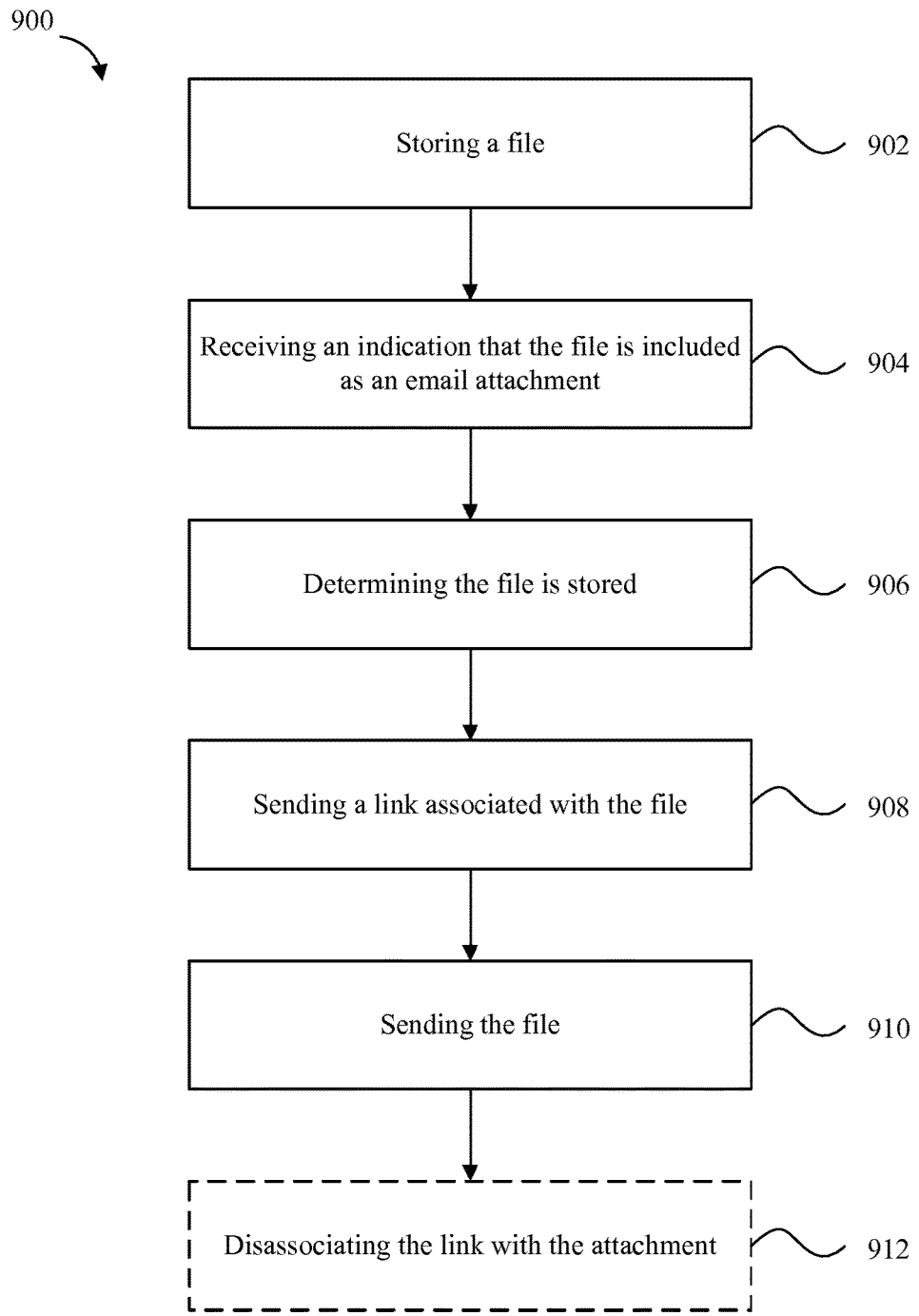
FIG. 9 shows a flowchart representing a method for hosting an email attachment in accordance with some embodiments.

FIG. 9 shows a flowchart 900 representing a method for hosting an email attachment in accordance with some embodiments. The method can be carried out by an exemplary file server 124. In a first step at 902, the file server 124 stores a file. At step 904, the file server 124 receives an indication from a client device, e.g., client device 102, that it is desired that the file be included as an email attachment. In some embodiments, the indication from the client device 102 can be the result of a new email being generated. In other embodiments, the indication can be the result of a pre-existing email (having the file as an attachment) being forwarded. In some embodiments, in addition to storing email attachments, the file server 124 can also function as a file hosting service, such as an online photo hosting service or work in conjunction with such services. For example, when selecting files to be included in an attachment, the client device 102 can identify files already stored at the file server 124. In this regard, step 904 can include also receiving an indication that the file is stored at the file server 124. For example, the client device 102 can provide a location of the file (e.g., a link) and/or other data that can cause the file server 124 to utilize the file stored at step 902. Accordingly, the file server 124 can determine the file is already stored at the file server 124 at step 906, obviating the need for the client device 102 to send the file to the file server 124 (i.e., obviating step 202 in FIG. 2 or step 412 in FIG. 4B).

At step 908, the file server 124 can send a link associated with the file stored at the file server 124 to the client device 102. In one case, the file may already be stored on file server 124 because the client device 102 previously sent the file via the file server 124 as an email attachment. Again, using the example depicted in FIG. 3, Michael sends John and Anne the files identified in attachment field 306 in a first email, causing the file 'paris.mov' to be sent to and stored at the file server 124 (i.e., step 902). Subsequently, Michael forwards the first email or generates a second email with 'paris.mov' as an attachment to Stacy. In one scenario, the file server 124 can send the client device 102, at step 908, the link associated with 'paris.mov' that was included in the first email. In another scenario, the file server 124 can send the client device 102, at step 908, a new link associated with the copy of 'paris.mov' stored at the file server 124. In this regard, recipients can receive different links that point to the same file at the file server 124. In embodiments in which links have an expiration date, each link can be have a unique expiration date that can be based on when (i.e., a date or time) a corresponding email was generated, sent, received and/or forwarded. Continuing the example above, if Michael forwards the first email to Stacy, Stacy can receive a new link to 'paris.mov' having an expiration date that is later than the expiration date associated with the link included in the first email (i.e., the expiration date of Jun. 8, 2014 as indicated in FIG. 5A). The "refreshed" expiration date (by way of a new link) can provide Stacy the same amount of time to download 'paris.mov' that was provided to John and Anne At step 910, the recipient, e.g., the client device 108, can retrieve the file from the file server 124. In embodiments in which the link is associated with an expiration date, the file server 124 can disassociate the link with the attachment when the link expires at 912. In this way, a remote device cannot use an expired link to retrieve the file from the file server 124. In some embodiments, the file server 124 can delete the file when the link (and/or all links associated with the file) expires at step 912.

Figure 10:
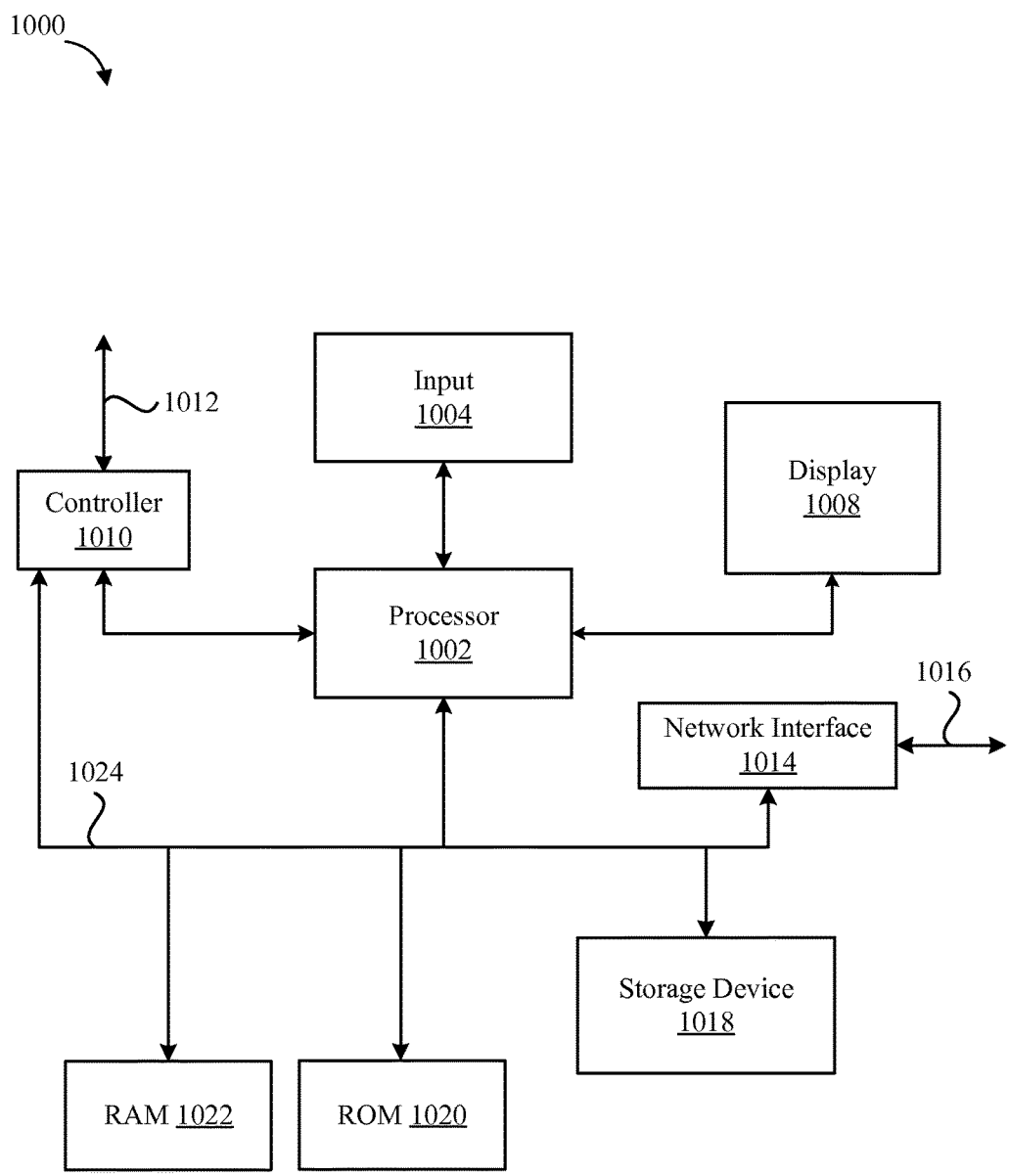
FIG. 10 shows a block diagram of a computing device in accordance with some embodiments.

FIG. 10 is a block diagram of a computing device 1000 that can represent the components of the client device 102/108, the mail servers 116/120 and/or the file server 124. It will be appreciated that the components, devices or elements illustrated in and described with respect to FIG. 10 may not be mandatory and thus some may be omitted in certain embodiments. The computing device 1000 can include a processor 1002 that represents a microprocessor, a coprocessor, circuitry and/or a controller for controlling the overall operation of computing device 1000. Although illustrated as a single processor, it can be appreciated that the processor 1002 can include a plurality of processors. The plurality of processors can be in operative communication with each other and can be collectively configured to perform one or more functionalities of the computing device 1000 as described herein. In some embodiments, the processor 1002 can be configured to execute instructions that can be stored at the computing device 1000 and/or that can be otherwise accessible to the processor 1002. As such, whether configured by hardware or by a combination of hardware and software, the processor 1002 can be capable of performing operations and actions in accordance with embodiments described herein.

The computing device 1000 can also include user input device 1004 that allows a user of the computing device 1000 to interact with the computing device 1000. For example, user input device 1004 can take a variety of forms, such as a button, keypad, dial, touch screen, audio input interface, visual/image capture input interface, input in the form of sensor data, etc. Still further, the computing device 1000 can include a display 1008 (screen display) that can be controlled by processor 1002 to display information to a user. Controller 1010 can be used to interface with and control different equipment through equipment control bus 1012. The computing device 1000 can also include a network/bus interface 1014 that couples to data link 1016. Data link 1016 can allow the computing device 1000 to couple to a host computer or to accessory devices. The data link 1016 can be provided over a wired connection or a wireless connection. In the case of a wireless connection, network/bus interface 1014 can include a wireless transceiver.

The computing device 1000 can also include a storage device 1018, which can have a single disk or a plurality of disks (e.g., hard drives) and a storage management module that manages one or more partitions (also referred to herein as "logical volumes") within the storage device 1018. In some embodiments, the storage device 1018 can include flash memory, semiconductor (solid state) memory or the like. Still further, the computing device 1000 can include Read-Only Memory (ROM) 1020 and Random Access Memory (RAM) 1022. The ROM 1020 can store programs, code, instructions, utilities or processes to be executed in a non-volatile manner. The RAM 1022 can provide volatile data storage, and store instructions related to components of the storage management module that are configured to carry out the various techniques described herein. The computing device 1000 can further include data bus 1024. Data bus 1024 can facilitate data and signal transfer between at least processor 1002, controller 1010, network interface 1014, storage device 1018, ROM 1020, and RAM 1022.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium is any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for sending files via emails, the method comprising, at a client device:
receiving a selection of at least one file to be included as an email attachment for an email;
identifying a condition in which to include, within the email, a link to download the at least one file in lieu of including the at least one file as the email attachment for the email;
in response to identifying the condition, providing, to a file server, information about the at least one file, wherein the file server identifies whether the at least one file is accessible based on a previous receipt of the at least one file;
when the file server identifies that the at least one file is not accessible:
providing the at least one file to the file server; and
receiving the link from the file server, wherein the link provides access to the at least one file;
embedding the link in the email; and
sending the email, wherein:
when at least one destination client device receives the email, the at least one destination client device automatically:
detects the link in the email,
downloads the at least one file using the link, and
updates the email to include the at least one file as the email attachment for the email; and
when the at least one destination client device forwards the email to another recipient via a new email, the at least one destination device replaces, within the new email, the link to the email attachment with a different link that provides access to the at least one file.

2. The method of claim 1, wherein the link is embedded in a header of the email.

3. The method of claim 1, wherein the link is embedded in a body of the email.

4. The method of claim 1, wherein the condition is based on one or more of (1) properties associated with an email server to which the email is initially sent, or (2) properties associated with the at least one file.

5. The method of claim 1, wherein the at least one file is an image file, and a thumbnail of the image file is included in the email.

6. The method of claim 1, wherein:
the at least one file is associated with two or more links,
the link and the different link are included in the two or more links, and
each link of the two or more links is associated with a respective different expiration time.

7. The method of claim 1, further comprising, subsequent to updating the email to include the at least one file as the email attachment for the email:
removing the link from the email.

8. A client device, comprising:
a network interface;
a display screen;
at least one processor; and
at least one storage device configured to store instructions, that when executed by the at least one processor, cause the client device to:
receive a selection of at least one file to be included as an email attachment for an email;
identify a condition in which to include, within the email, a link to download the at least one file in lieu of including the at least one file as the email attachment for the email;
in response to identifying the condition, provide, to a file server, information about the at least one file, wherein the file server identifies whether the at least one file is accessible based on a previous receipt of the at least one file;
when the file server identifies that the at least one file is not accessible:
provide the at least one file to the file server; and
receive the link from the file server, wherein the link provides access to the at least one file;
embed the link in the email; and
send the email, wherein:
when at least one destination client device receives the email, the at least one destination client device automatically:
detects the link in the email,
downloads the at least one file using the link, and
updates the email to include the at least one file as the email attachment for the email; and
when the at least one destination client device forwards the email to another recipient via a new email, the at least one destination device replaces, within the new email, the link to the email attachment with a different link that provides access to the at least one file.

9. The client device of claim 8, wherein the link is embedded in a header of the email.

10. The client device of claim 8, wherein the link is embedded in a body of the email.

11. The client device of claim 8, wherein the condition is based on one or more of (1) properties associated with an email server to which the email is initially sent, or (2) properties associated with the at least one file.

12. The client device of claim 8, wherein the at least one file is an image file, and a thumbnail of the image file is included in the email.

13. The client device of claim 8, wherein:
the at least one file is associated with two or more links,
the link and the different link are included in the two or more links, and
each link of the two or more links is associated with a respective different expiration time.

14. The client device of claim 13, wherein, when an expiration time of an associated link is satisfied, the associated at least one file cannot be obtained via the associated link.

15. The client device of claim 8, wherein the email is sent to an email server that is different from the file server.

16. The client device of claim 8, wherein the at least one processor further causes the client device to, subsequent to updating the email to include the at least one file as the email attachment for the email:
remove the link from the email.

17. At least one non-transitory computer readable storage medium configured to store instructions that, when executed by at least one processor included in a client device, cause the client device to:
receive a selection of at least one file to be included as an email attachment for an email;
identify a condition in which to include, within the email, a link to download the at least one file in lieu of including the at least one file as the email attachment for the email;

in response to identifying the condition, provide, to a file server, information about the at least one file, wherein the file server identifies whether the at least one file is accessible based on a previous receipt of the at least one file;

when the file server identifies that the at least one file is not accessible:
  provide the at least one file to the file server; and
  receive the link from the file server, wherein the link provides access to the at least one file;

embed the link in the email; and send the email, wherein:
  when at least one destination client device receives the email, the at least one destination client device automatically:
    detects the link in the email,
    downloads the at least one file using the link, and
    updates the email to include the at least one file as the email attachment for the email; and
  when the at least one destination client device forwards the email to another recipient via a new email, the at least one destination device replaces, within the new email, the link to the email attachment with a different link that provides access to the at least one file.

18. The at least one non-transitory computer readable storage medium of claim 17, wherein the condition is based on one or more of (1) properties associated with an email server to which the email is initially sent, or (2) properties associated with the at least one file.

19. The at least one non-transitory computer readable storage medium of claim 17, wherein the email is sent to an email server that is different from the file server.

20. The at least one non-transitory computer readable storage medium of claim 17, wherein the at least one processor further causes the client device to, subsequent to updating the email to include the at least one file as the email attachment for the email: remove the link from the email.

* * * * *